United States Patent
Lee

(10) Patent No.: US 8,705,919 B2
(45) Date of Patent: Apr. 22, 2014

(54) LENS-INTEGRATED OPTICAL WAVEGUIDE AND METHOD OF MAKING THE SAME

(75) Inventor: Genn-Sheng Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 125 days.

(21) Appl. No.: 13/351,551

(22) Filed: Jan. 17, 2012

(65) Prior Publication Data

US 2012/0183255 A1    Jul. 19, 2012

(30) Foreign Application Priority Data

Jan. 18, 2011   (TW) ................................. 100101787

(51) Int. Cl.
  *G02B 6/32*    (2006.01)
(52) U.S. Cl.
  USPC .............................................. 385/33; 385/50
(58) Field of Classification Search
  None
  See application file for complete search history.

(56) References Cited

U.S. PATENT DOCUMENTS

| 4,338,352 A | 7/1982 | Bear et al. |
| 6,488,417 B2 | 12/2002 | Kropp |
| 6,625,351 B2 | 9/2003 | Cox et al. |
| 6,674,940 B2 | 1/2004 | Kroupenkine |
| 6,944,371 B2 | 9/2005 | Kaneko |
| 7,137,746 B2 | 11/2006 | Kato |
| 7,565,047 B2 | 7/2009 | Nishizawa et al. |
| 2007/0269165 A1* | 11/2007 | Hirose ............................ 385/50 |

* cited by examiner

*Primary Examiner* — Jerry Rahll
(74) *Attorney, Agent, or Firm* — Wei Te Chung; Ming Chieh Chang

(57) ABSTRACT

A lens-integrated optical waveguide includes an optical conduit, a lens, and a non-wetting coating underlying the lens. A method for making an lens-integrated optical waveguide includes: forming an optical conduit having an end defining a planar end surface through which lights are transmitted out and received in; injecting a curable glue into a mold to form a pool of curable glues, the mold including a cavity having a concave shape to define a lens outer face; dipping the planar end of the optical conduit into the pool of curable glues; and curing the pool of curable glues onto the planar end surface of the optical conduit.

5 Claims, 9 Drawing Sheets

LENS-INTEGRATED OPTICAL WAVEGUIDE AND METHOD OF MAKING THE SAME

BACKGROUND OF THE INVENTION

1. Field of the invention

The present invention relates to a lens-integrated optical waveguide and a method of making a lens-integrated optical waveguide.

2. Description of Related Art

Referring to FIG. 1, lights transferring is shown between a transferring waveguide and a receiving waveguide, each having a planar base 22, a plurality of optical cores 20, and a cladding 24 covering the base 22 and the core 20. There is no lens between the two waveguides. Therefore, some of the lights from the transferring waveguide are scattered and not received by the optical core 20 of the receiving waveguide.

U.S. Pat. No. 6,625,351, issued to Cox et al. on Sep. 23, 2003, discloses that collimating microlenses are "printed" from optical polymeric materials on ends of optical fibers using ink-jet technology. In one embodiment the optical fibers are inserted into a collet, a stand-off distance from the open upper end of the collet. The open upper end is filled with optical fluid and a microlens is formed thereon to collimate light exiting the fiber through the microlens. In another embodiment optical fibers from a "ribbon" are separated and installed into a ferrule having multiple openings therethrough. In the same manner as in the collet embodiment, the ferrule openings serve as a mold for the lens formation with the end of the fiber being located at the focal distance of the lenslet formed in an on the ferrule. A non-wetting coating can serve to control spreading of the fluid optical material and allow lens radius control as well. The microlenses are hardened after formation.

U.S. Pat. No. 7,137,746 issued to Cato on Nov. 21, 2006, discloses a method to integrally form a lens on an end of an optical waveguide structure. The lens is formed on a cross-section of optical fiber which has been cut perpendicularly to a waveguide path corresponding to a light-receiving element and polished to make it flat. A specific method of forming the lens is to blow about one drop per one optical fiber of a liquid ultraviolet hardening resin by ink jet technology or the like, and then expose it to ultraviolet light to harden the resin. The shape of the lens does not need to be controlled precisely partly because the lens diameter is smaller, and lens formation can be achieved with good reproducibility by adjusting the viscosity of the ultraviolet hardening resin or other resin.

There is a need to provide a different lens-integrated waveguide.

SUMMARY OF THE INVENTION

An optical waveguide comprises: an optical conduit having an end defining an end surface through which lights are transmitted out and received in, the optical conduit having a planar base, an array of optical cores, and a cladding covering the base and the array of optical cores; a transparent membrane applied on the end surface of the optical conduit; and a lens being formed, from a curable glue, integrally on the transparent membrane, the lens having a raised shape adjusted by the transparent membrane before being cured.

A method for making an optical waveguide, comprising the steps of: forming an optical conduit having an end defining a planar end surface through which lights are transmitted out and received in; injecting a curable glue into a mold to form a pool of curable glues, the mold including a cavity having a concave shape to define a lens outer face; dipping the planar end of the optical conduit into the pool of curable glues; and curing the pool of curable glues onto the planar end surface of the optical conduit.

Other objects, advantages and novel features of the invention will become more apparent from the following detailed description of preferred embodiments when taken in conjunction with the accompanying drawings.

BRIEF DESCRIPTION OF THE DRAWINGS

FIG. 3 shows the optical conduit applied with curable glue under UV radiation;

FIG. 4 is a scaled view of a circled portion of FIG. 3;

DETAILED DESCRIPTION OF THE INVENTION

Figure 1:
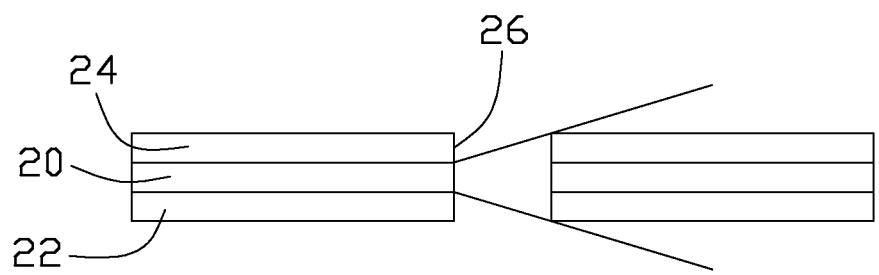
FIG. 1 shows a beam of light transmitted out from a transmitting waveguide into a receiving waveguide.

Reference will now be made to the drawing figures to describe the present invention in detail.

Figure 2:
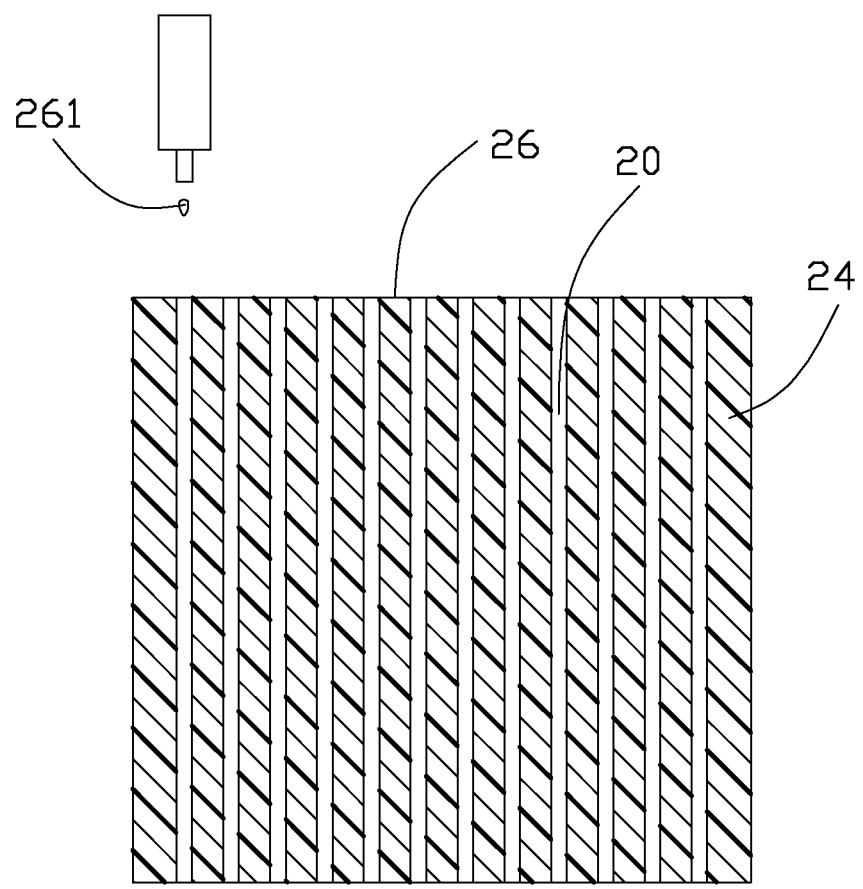
FIGS. 2-4 shows a first embodiment of the present invention and FIG. 2 shows an optical conduit to be applied with curable glue.
Figure 3:
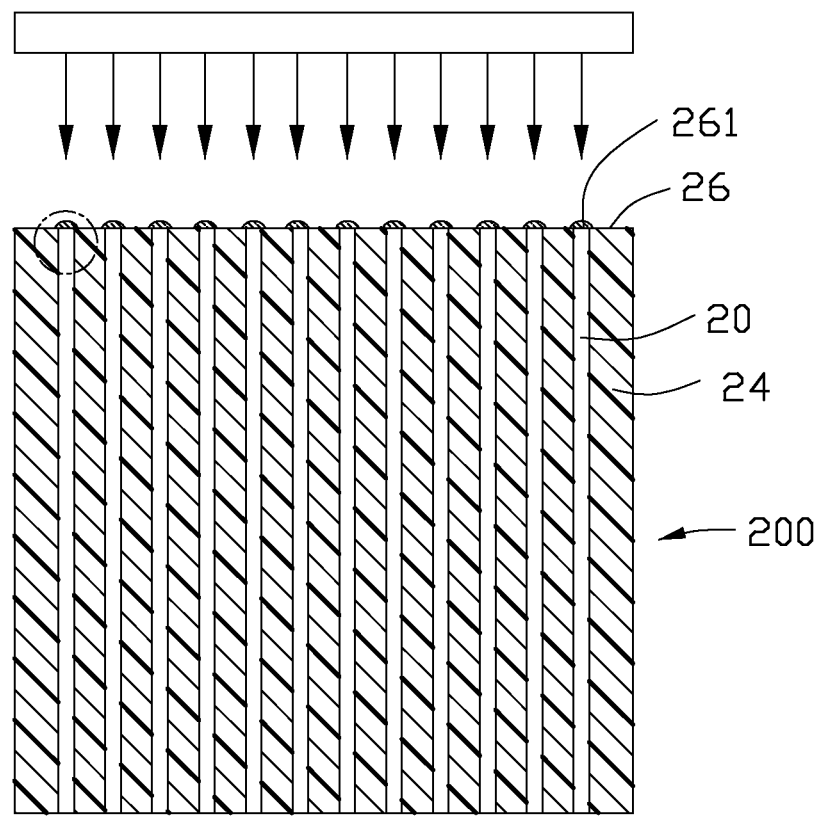
Figure 4:
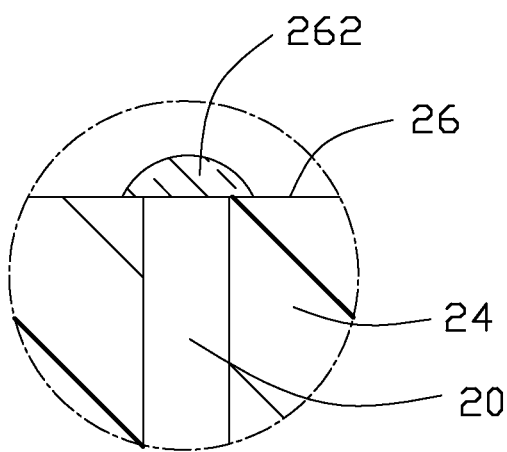

Referring to FIGS. 2-4, a first embodiment of the present invention is shown. The method of making the waveguide comprises the following steps:

(1) forming an optical conduit 200 having a planar end surface 26, the optical conduit comprising a planar base 22, a plurality of optical cores 20 arrayed on the base 22, and a clad 24 covering the base 22 and the plurality of optical cores 20;

(2) dropping a plurality drops of curable glue 261 to the end surface 26 aligned to the cores 20 of the optical conduit;

(3) the drops of curable glue 261 are formed into a shape of the lens under the liquid surface tension of the curable glue; and (4) curing the curable glue 261 into solid thereby forming the lens.

It is understandable that the steps (2) and (3) are not necessarily separately completed in time sequence. In the first embodiment, the steps (2) and (3) are completed at the same time.

Figure 5:
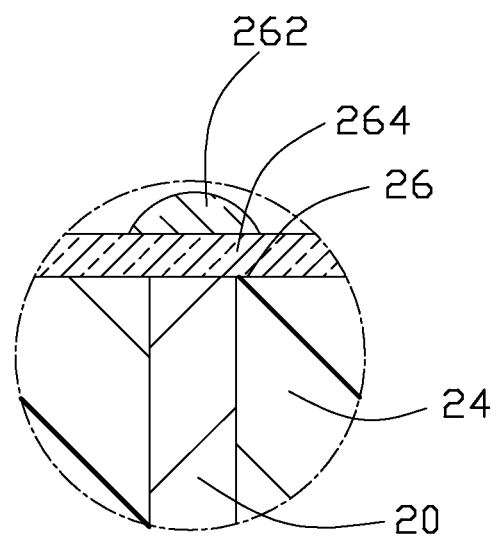
FIG. 5 is a similar view of FIG. 4 except that a transparent membrane to control the liquid surface tension of the curable glue is applied thereon according to a second embodiment of the present invention.
Figure 6:
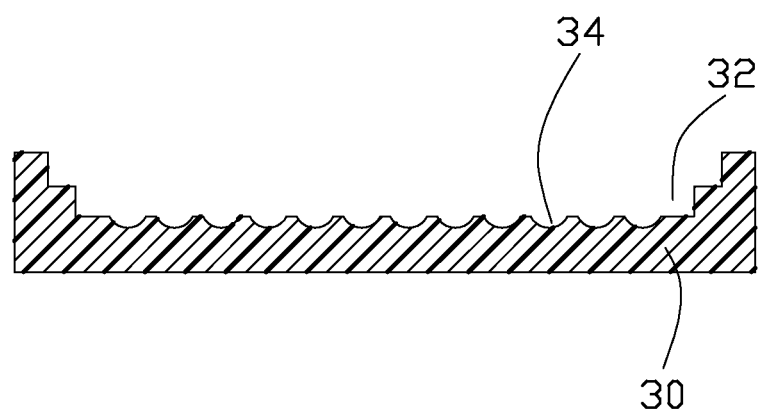
FIG. 6 is a cross-section of a transparent mold according to a third embodiment of the present invention.
Figure 7:
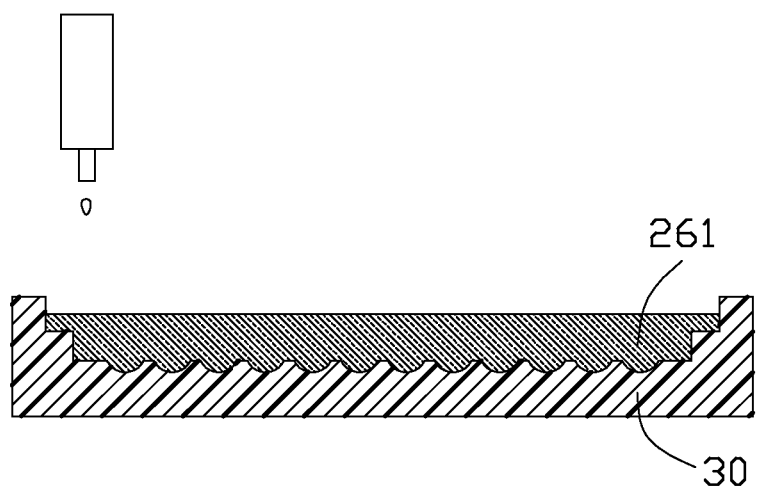
FIG. 7 is a similar view of FIG. 6 except that curable glue is injected into the mold.
Figure 8:
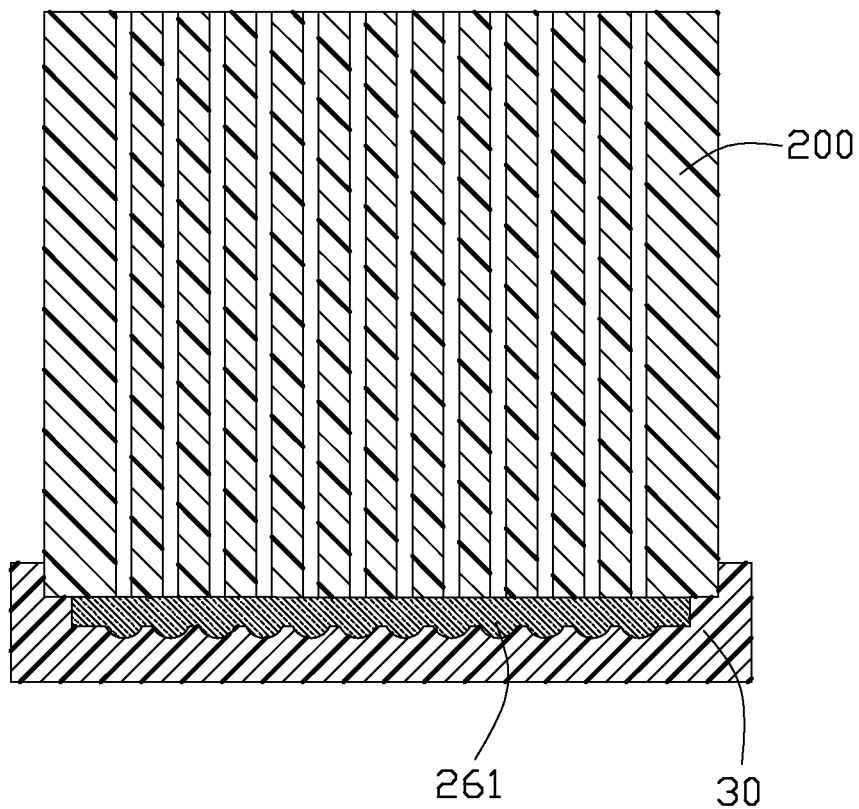
FIG. 8 is a view showing an end surface of the optical conduit dipped into the curable glue in the mold shown in FIG. 8.
Figure 9:
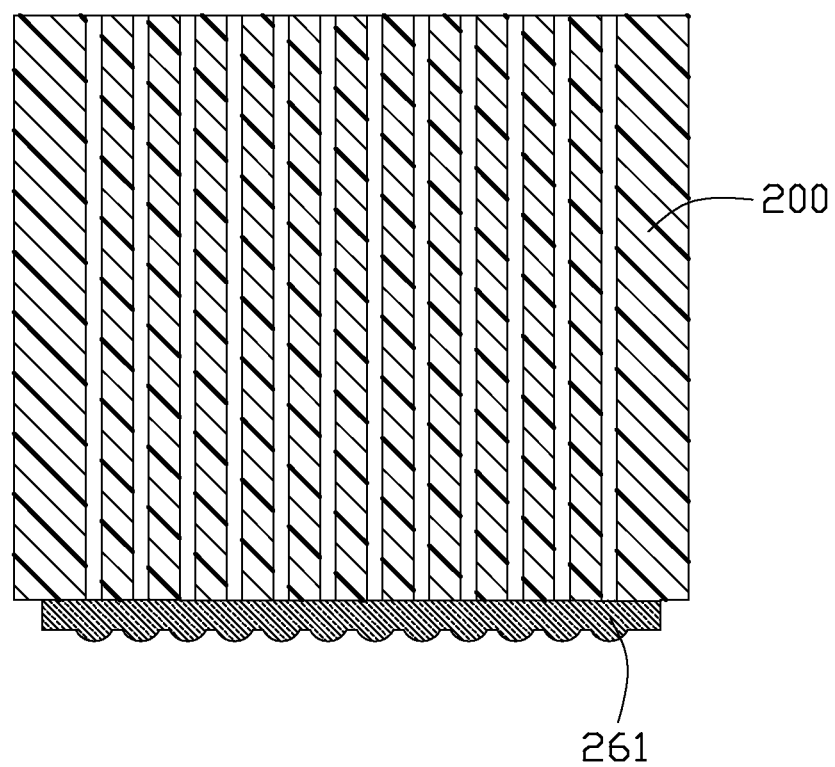
FIG. 9 shows a waveguide manufactured through the third embodiment of the present invention.

A second embodiment of the present invention is disclosed similar to the first embodiment except that a transparent membrane 264 is applied on the end surface 26 of the optical conduit before dropping the curable glue 262 thereon to control the surface tension of the curable glue 262, which is best shown in FIG. 5.

A third embodiment of the present invention is different from the first embodiment in the steps (2), (3) and (4). The method of making the waveguide according to the third embodiment comprises the following steps:

(1) forming the optical conduit 200 having a planar end surface 26, the optical conduit comprising a planar base 22, a plurality of optical cores 20 arrayed on the base 22, and a clad 24 covering the base 22 and the plurality of optical cores 20;

(2) dropping curable glue 261 into a transparent mold 30 having a pool portion 32, the pool portion 32 having a plurality of cavities 34 corresponding to the optical cores 20 of the waveguide 200, each of the cavities 34 defining a concave shape in according to the lens in order to refract the lights transmitted out from the cores 20 of the waveguide 200, the curable glue 261 covering the cavities 34 and forming a pool of the curable glue 261;

(3) dipping an end of the optical conduit 200 into the pool portion 32, the end surface 26 of the optical conduit 200 being set below a top surface of the pool of the curable glue 261 with the concaves 34 aligned to the cores 20 of the optical conduit 200;

(4) radiating the curable glue 261 in the transparent mold 30 with UV to cure it; and (5) removing the transparent mold 30 with the cured glue 261 integrated with the optical conduit thereby getting the waveguide.

The disclosure is illustrative only, changes may be made in detail, especially in matter of shape, size, and arrangement of parts within the principles of the invention.

What is claimed is:

1. An optical waveguide comprising:
   an optical conduit having an end defining an end surface through which lights are transmitted out and received in, the optical conduit having a planar base, an array of optical cores, and a cladding covering the base and the array of optical cores;
   a transparent membrane applied on the end surface of the optical conduit; and
   a lens being made of a curable glue, materially different from and structurally discrete from while being integrally formed on the transparent membrane, the lens having a raised shape adjusted by the transparent membrane before being cured.

2. A method for making an optical waveguide comprising the following steps:
   forming an optical conduit having an end defining a planar end surface through which lights are transmitted out and received in;
   injecting a curable glue into a mold to form a pool of curable glues, the mold including a cavity having a concave shape to define a lens outer face;
   dipping the planar end of the optical conduit into the pool of the curable glues; and
   curing the pool of the curable glues onto the planar end surface of the optical conduit; wherein
   the step of curing comprises irradiating UV light through the molde that is substantially transparent to light.

3. A method for making an optical waveguide comprising the following steps:
   providing an optical conduit having an end defining an end surface, the optical conduit having a planar base, a plurality of optical cores arrayed on the base, and a clad covering the base and the plurality of optical cores, a plurality of separated areas formed on the end surface and aligned to each of the optical cores through which lights are transmitted out from and received into corresponding optical cores;
   putting a predetermined volume of curable glue onto each said separated areas to form a small pile having a raised shape under liquid surface tension; and
   curing the small piles of the curable glue on the separated areas to form a plurality of lenses aligned to each said optical cores.

4. The method for making an optical waveguide according to claim 3, wherein the step of curing the curable glue is realized by UV radiation.

5. The method for making an optical waveguide according to claim 3, further comprising a step of applying a transparent membrane onto the end surface of the optical conduit to control the raised shape of the curable glue before the step of putting the curable glue onto the separated areas.

* * * * *